April 3, 1956 — O. A. MILLER — 2,740,218
FLORAL WREATHS
Filed March 14, 1955
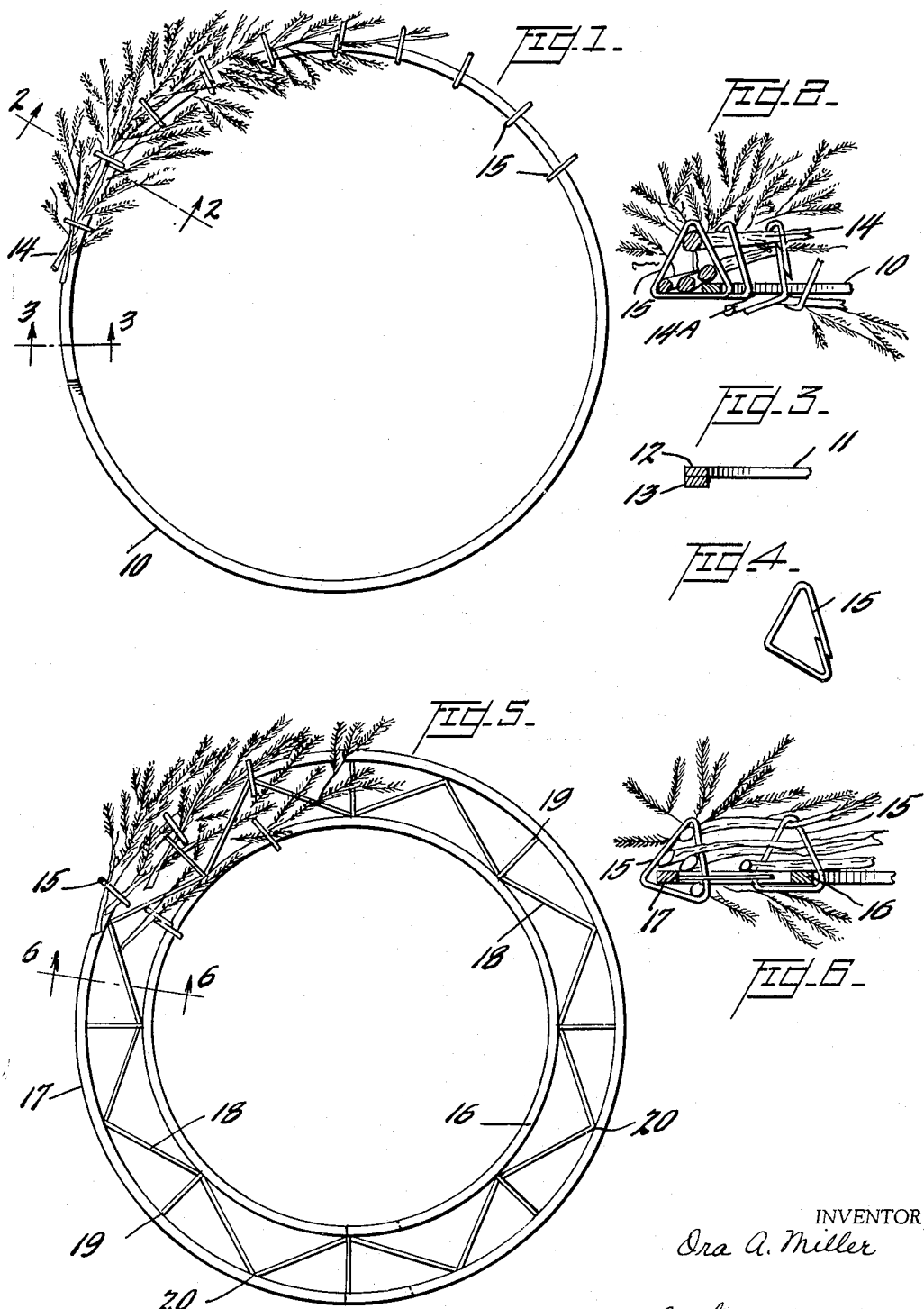
INVENTOR,
Ora A. Miller
BY Coatson, Cole, Brindle & Watson
ATTORNEYS

United States Patent Office 2,740,218
Patented Apr. 3, 1956

2,740,218

FLORAL WREATHS

Ora A. Miller, Kalispell, Mont.

Application March 14, 1955, Serial No. 494,118

2 Claims. (Cl. 41—12)

The invention relates to floral wreaths and to a process for their manufacture. More specifically, this invention relates to wreaths which consist of floral ornamentation secured to a frame by means of staples or the like, and the manner of making the same.

In the past, numerous methods have been devised for the attachment of branches to a frame in the manufacture of floral wreaths. Thus, locking wires, cords and even glue have been utilized for this purpose. However, most of these methods required a great deal of time, labor and material. Moreover, the wreaths made by these methods were often comparatively expensive and the branches tended to fall off the frame, thus ruining the decorative and commercial value of the wreaths.

One object of the present invention is, therefore, to provide a floral wreath which retains its decorative appearance and shape for an extended period of time in spite of relatively rough handling.

Another object of this invention is to provide floral wreaths in which the flora is effectively attached to the frame in a manner which materially reduces the cost of manufacture.

Still another object of this invention is to provide a process for the preparation of floral wreaths in which frames and cooperating staples or the like hold each branch or flower firmly in position maintaining a more uniform and attractive appearance.

Other and further objects, features and advantages will be apparent from the description which follows, read in connection with the accompanying drawing, in which:

Figure 1 is a plan view of the wreath showing the frame, staples attached thereto, and the evergreen branches which are secured to the frame by means of these staples.

Figure 2 is a section taken along line 2—2 of Figure 1 showing in greater detail the manner in which the branches are attached to the frame by means of staples.

Figure 3 is a section taken along line 3—3 of Figure 1 showing in greater detail the relative position of the end portions of the frame.

Figure 4 shows in detail one type of staple found useful in fixing the branches in position on the frame.

Figure 5 is a plan view of a double wreath showing the wiring means by which the inner ring is attached to the outer ring of the frame.

Figure 6 is a section taken along line 6—6 of Figure 5 and shows the manner in which the branches are fixedly secured to each ring.

Referring now in detail to the drawings, ring 10 constitutes the frame to which a plurality of evergreen branches such as 14, or other appropriate flora, are attached. The frame is usually circular but may be any appropriate shape. Thus it can be triangular, square, polygonal or irregularly shaped as the taste of the public may demand. This frame is constructed of any strong, reasonably rigid material. Iron wire has been found most desirable. The frame is preferably flattened as is shown at 11 in Figure 3 and the end portions attached to one another. It has been found that the use of a flattened frame results in a more sturdy wreath than the use of a frame which has not been flattened. The end portions, as at 12 and 13 in Figure 3, may be overlapped and attached by soldering, welding or other suitable means. Of course, these end portions may be attached in end to end relation as well as the overlapping position shown in Figure 3.

Any suitable floral decorations such as the evergreen branches 14 may be attached to the frame of the wreath. Both natural and artificial flora are practical. Moreover, the size of the branches 14 may vary to a considerable degree and will still remain secured by the staples 15. As shown by the position of branches 14 and 14A in Figure 2, these branches may be attached to both the back and front sides of the frame. In other words, it is possible to make either a single or double-faced wreath by simply altering the position of the staples.

Figure 4 shows one of the staples 15 which fasten branches 14 and 14A to the frame 10. It will be readily recognized that the staple shown in Figure 4 is roughly triangular in shape. It has been found that the acute angles formed at the corners of the triangular staple designated as 15 in Figure 4 accommodate the flattened wire frame so that the branches cannot twist from their position between the staples and flattened frame. In other words, the flattened frame is rigidly secured against the corner of the staples so that the branches placed between the staple and frame are firmly wedged in their position. It will be readily recognized then that any staple possessing as many or more acute and right angles than obtuse angles at its corners is most suitable for the purposes of this invention. Triangular and quadrangular staples are, therefore, preferred to regular polygonal staples having more than four sides.

Other attaching means may be used as well as the staples described. Any equivalent attaching means providing acute angles at its corners which fixedly engage the frame in the manner described is acceptable. As long as the attaching means cooperates with the frame about which it is wrapped to hold the branches in their position it is satisfactory for the purpose of this invention.

Figure 5 shows another embodiment of this invention possessing two flattened body portions, 16 and 17. The flattened rings shown in Figure 5 are securely attached to one another by wire 18 which extends between the circumferences of the two rings. This wire is attached to the flattened rings by appropriate means such as electric spot welding at points 19 and 20 in Figure 5. Attached in this way the two rings constitute the frame.

Figure 6 shows the manner in which evergreen branches are wedged between the flattened ring and adjacent staples in the completed double ring wreath. It has been found advantageous to use this double-ring structure when constructing wreaths over 20 inches in diameter. Multi-ring structures of this sort permit the production of wreaths of virtually any size desired. It is, of course, possible to use more than two rings.

In one preferred method of preparing these wreaths metallic wire is flattened so that staples cannot easily rotate on the wire. Any flattening mechanism can be used for this purpose. For example, a simple roller has been found most useful. The wire cannot be flattened, however, beyond the point at which it will retain its rigidity and shape. After the wire is properly flattened it is cut into suitable lengths. The resulting wire segments may now be bent to the desired shape by a roller or similar device. The two ends of each wire segment are then attached to one another. When metal segments are used the ends may be attached by electric welding. However, any other convenient method of attaching the end portions of the wire may be employed. Figure 3 shows flattened end portion 12 lying over flattened end portion 13 of the wire 11. It is also possible, however, to attach the end portions of the wire in an end to end alignment. Flora such as evergreen boughs, are then placed on the ring at a common point and fixed in place by staples or an equivalent means adapted to securely hold the boughs against twisting or other displacement. The operation progresses by placing boughs continuously along the circumference of the ring and fixing them in place by stapling or by an equivalent attaching means until the starting point is again reached. In this way, a substantially uniform appearance is effected. It is possible to make either a single-faced or double-faced wreath in this operation.

In either the single- or multi-ringed wreath the staples or the like which are used as clamps need not be spaced at equal distances along the circumference of the ring. Because these attaching means accommodate branches varying greatly in diameter, they are placed along the circumference of the frame wherever necessary to fixedly secure the flora thereto. Thus branches varying in diameter from the very smallest to the very largest suitable for wreaths of this sort may be successfully secured to the frame.

Another advantage of these wreaths lies in the fact that the frames may be re-used after the removal of the staples or other attaching means. This characteristic is particularly worthwhile in the case of larger wreaths having a double ring.

Having thus described this invention, what is claimed as new and desired to be secured by Letters Patent is:

1. A floral wreath comprising a circular flattened metallic wire frame member, floral ornamentation disposed along the entire circumference of both flattened surfaces of said frame member, and a plurality of triangular shaped metallic staples securing said floral ornamentation along the entire circumference of both flattened surfaces of said frame member, the bundle comprising said flattened frame member and said floral ornamentation being wedged into the angles of each of said staples.

2. A floral wreath comprising a circular flattened metallic wire frame member, said frame member having a smaller flattened wire ring within the plane of a larger flattened wire ring and attached thereto by wires, floral ornamentation disposed along the entire circumference of both flattened wire rings, and a plurality of triangular shaped metallic staples securing said floral ornamentation along the entire circumference of each flattened wire ring, the bundle comprising each flattened wire ring and its associated floral ornamentation being wedged into the angles of said associated staples.

References Cited in the file of this patent

UNITED STATES PATENTS

| | | |
|---|---|---|
| 1,478,487 | Ross | Dec. 25, 1923 |
| 1,696,221 | Tubbs | Dec. 25, 1928 |
| 1,804,104 | Koropp | May 5, 1931 |